United States Patent [19]

Isobe et al.

[11] 4,361,621
[45] Nov. 30, 1982

[54] MAGNETIC RECORDING MEDIUM

[75] Inventors: Yukihiro Isobe; Kiyotaka Okuyama; Akihiko Hosaka; Hideo Kobayashi, all of Tokyo, Japan

[73] Assignee: TDK Electronics Co., Ltd., Tokyo, Japan

[21] Appl. No.: 270,565

[22] Filed: Jun. 4, 1981

[30] Foreign Application Priority Data

Jun. 20, 1980 [JP] Japan .................................. 55-83662

[51] Int. Cl.³ .............................................. B32B 5/16
[52] U.S. Cl. .................................... 428/329; 427/127; 427/128; 428/328; 428/341; 428/403; 428/413; 428/425.9; 428/480; 428/522; 428/532; 428/694; 428/900

[58] Field of Search ................................. 427/127–132, 427/48; 428/532, 694, 328, 695, 341, 900, 413, 403, 425.9, 489, 522; 252/62.54

[56] References Cited

U.S. PATENT DOCUMENTS 4,247,593  1/1981  Seto ..................................... 427/127

Primary Examiner—Bernard D. Pianalto
Attorney, Agent, or Firm—Oblon, Fisher, Spivak, McClelland & Maier

[57] ABSTRACT

A magnetic recording medium comprises a substrate coated with a magnetic layer formed by using a magnetic composition comprising a binder and a magnetic powder adsorbing ricinoleic acid or an ester thereof.

5 Claims, No Drawings

MAGNETIC RECORDING MEDIUM

BACKGROUND OF THE INVENTION

1. Field of the Invention

The present invention relates to an improvement of a magnetic recording medium which is used as a video tape, a computer tape an audio tape or a disk thereof.

2. Description of the Prior Arts

In usual, these magnetic recording media have been prepared by blending a magnetic powder to a binder and coating a resulting magnetic composition on a substrate. When the magnetic recording media run under contacting with a magnetic head, the magnetic powder or the binder of the magnetic layer is peeled off to cause a clogging of the magnetic head and a drop-out is caused.

In order to overcome the disadvantage, it is important that the magnetic layer has a structure having high adhesive strength. It is indispensable to increase the adhesive force of the magnetic powder to the binder. Various developments such as a development of a binder which has high wet affinity to a magnetic powder and high dispersibility of the magnetic powder or an improvement of a surface of the magnetic powder have been proposed.

SUMMARY OF THE INVENTION

It is an object of the present invention to provide a magnetic recording medium which has a magnetic layer having high adhesive strength to prevent the peeling-off of a magnetic powder of the magnetic layer.

The foregoing and other objects of the present invention have been attained by providing a magnetic recording medium which comprises a substrate coated with a magnetic layer formed by using a magnetic composition comprising a binder and a magnetic powder adsorbing ricinoleic acid or an ester thereof.

DETAILED DESCRIPTION OF THE PREFERRED EMBODIMENTS

The present invention is to effectively overcome the abovementioned problems for the magnetic recording media and is to provide a magnetic recording medium having the magnetic layer having high adhesive strength of the magnetic powder to the binder which prevents a peeling-off of the magnetic powder.

In the magnetic recording medium of the present invention, ricinoleic acid $C_{17}H_{32}(OH)COOH$ as an oxycarboxylic acid is adsorbed on the surface of the magnetic powder so as to increase the adhesive strength of the magnetic powder to the binder in view of the characteristics of the oxycarboxylic acid.

Ricinoleic acid has hydroxyl group and carboxyl group as polar groups and an alkenyl group as a nonpolar group in the molecular structure. When the magnetic powder as a hydrophilic powder is treated with ricinoleic acid, hydroxyl groups or carboxyl groups of ricinoleic acid are orientated on the surface of the magnetic powder to firmly bond each other because of mutual polarities. On the other hand the alkenyl groups are oriented on the outer surface whereby the outer surface of the magnetic powder on which ricinoleic acid is adsorbed, has hydrophobic property to be easily wet to the binder. In comparison with the non-treated magnetic powder, the adhesive strength of the magnetic powder to the binder is increased.

The effect of the ricinoleic acid is especially remarkable in the case of the magnetic composition comprising a thermosettable binder such as an isocyanate curing agent type binder. This fact is further understood in comparison with use of oleic acid which has similar structure to ricinoleic acid. When oleic acid is adsorbed on the surface of the magnetic powder, oleic acid can be adsorbed by the similar bonding force to that of ricinoleic acid as the effect of carboxyl groups and alkenyl groups are orientated on the outer surface to increase the affinity to the binder, whereby the bonding force of the magnetic powder to the binder is increased. However, the adhesive strength is resulted only by the intermolecular force.

On the other hand, ricinoleic acid has the molecular structure adding one hydroxyl group to that of oleic acid. When ricinoleic acid is adsorbed on the surface of the magnetic powder, certain hydroxyl groups of ricinoleic acid are placed on the outer surface whereby hydroxyl groups can react with isocyanate groups. Moreover, the reaction of hydroxyl groups with isocyanate groups is simultaneously performed with the reaction of hydroxyl groups of the binder with the isocyanate groups. Therefore, the magnetic powder can be chemically bonded through ricinoleic acid to the binder. The adhesive strength is remarkably higher than the intermolecular force. If the isocyanate is a polyfunctional isocyanate, the magnetic powder is bonded in the three dimensional net structure of the crosslinked binder, whereby excellent magnetic layer having higher adhesive strength, higher durability and higher wearing resistance can be formed.

Ricinoleic acid has high adsorbing force and accordingly, ricinoleic acid can be added in the step of dispersing the magnetic powder in the magnetic composition, ricinoleic acid can be adsorbed on the surface of the magnetic powder whereby the same effect can be provided. The pretreatment of the magnetic powder with ricinoleic acid is further effective because the probability of adsorption of ricinoleic acid on the surface of the magnetic powder is increased.

Ricinoleic acid ester can be also used when ricinoleic acid is formed by a hydrolysis of the ester.

The ratio of ricinoleic acid to the magnetic powder is not critical and can be considered to form at least monomolecular layer of ricinoleic acid and is preferably in a range of 2.0 to 40 wt.% especially 2,0 to 20 wt.%.

The magnetic powder can be iron group metal oxides and metal such as Co-adsorbed $\gamma$-$Fe_2O_3$, Co-adsorbed $Fe_3O_4$, $\gamma$-$Fe_2O_3$, $Fe_3O_4$, $CrO_2$, Co-Ni, Fe-Co and Fe.

The binder can be the conventional binders such as polyurethane, vinyl chloride-vinyl acetate copolymer, vinyl chloride-vinyl acetate-vinyl alcohol copolymer, epoxy resin, polyester resin and nitrocellulose. It is preferable to add an isocyanate as a curing agent. The substrate can be conventional substrates such as polyethyleneterephthalate film, disk or sheet.

Ricinoleic acid is preferably dissolved in an organic solvent such as toluene and the magnetic powder is dipped in the solution of ricinoleic acid and the magnetic powder is separated from the solution and dried to prepare the ricinoleic acid-adsorbed magnetic powder.

The present invention will be further illustrated by certain examples and references which are provided for purposes of illustration only.

EXAMPLE

Into 100 wt. parts of toluene, 100 wt. parts of a magnetic powder was added with ① 2 wt. parts, ② 20 wt. parts of ③ 40 wt. parts of ricinoleic acid was respectively added and each mixture was stirred. The magnetic powder was separated by a filter and dried. The treated magnetic powder was used to prepare each magnetic composition having the following formula:

| Treated magnetic powder: | 100 wt. parts |
| Abrasive powder Al₂O₃: (diameter of 1) | 3 wt. parts |
| Nitrocellulose (½μ): | 6 wt. parts |
| Epoxy resin (Epicoat 1004: Shell): | 4 wt. parts |
| Polyurethane (Nippolant 5033: Nippon Polyurethane): | 10 wt. parts |
| Solvent: | 250 wt. parts |

The components were treated by a sand mill for 5 hours to disperse the powder and 4 wt. parts of isocyanate (Colonate L: Nippon Polyurethane) was added. The magnetic composition was coated on a polyethyleneterephthalate film having a thickness of 14μ under a magnetic orientation treatment and then, it was dried and calendered and cured at 60° C. for 48 hours and the film was cut in a width of ½ inch.
Sample ①, Sample ② and Sample ③ were respectively prepared by using the treated magnetic powders ①, ② and ③.

REFERENCE

Into 1000 wt. parts of toluene, 100 wt. parts of a magnetic powder was added ④ without any additive or ⑤ with 20 wt. parts of oleic acid, and each treated magnetic powder was prepared. In accordance with the process of Example, except using the treated magnetic powder ④ or ⑤, each of Sample ④ and Sample ⑤ was prepared.

The resulting samples were tested. The results are shown in Table. The adsorbed amount means the amount of the additive adsorbed on the magnetic powder.

TABLE

| Sample | Example | | | Reference | |
|---|---|---|---|---|---|
| | ① | ② | ③ | ④ | ⑤ |
| Amount of additive added (%) | 2 | 20 | 40 | 0 | 20 |
| Adsorbed amount of additive (%) | 0.54 | 2.9 | 11.3 | 0 | 4.7 |
| Squareness ratio | 0.80 | 0.81 | 0.80 | 0.72 | 0.80 |
| Gloss (%) | 170 | 180 | 160 | 140 | 170 |
| Still time (min.) | 60 over | 60 over | 60 over | 3–10 | 3–60 |

As shown in Table, the squareness and the gloss were improved and the dispersibility was improved by the treatment with ricinoleic acid. The effects were also found by the treatment with oleic acid.

The still time was improved to be longer than 60 minutes by the treatment with ricinoleic acid, whereas the still time was only 3 to 10 minutes in the case of non-treatment (Sample ④) and it was slightly longer than that of the non-treatment in the treatment with oleic acid (Sample ⑤).

It was found that the effect of the treatment with ricinoleic acid was significant to form the magnetic layer having excellent durability.

As the effects of the treatment with ricinoleic acid, the effect is clearly found at a ratio of 2 wt.% of ricinoleic acid. The squareness and the gloss and the still time are substantially the same in the treatment with upto 40 wt.% of ricinoleic acid. When the ratio of ricinoleic acid is more than 40 wt.%, the remained ricinoleic acid in the magnetic layer is increased to cause blooming or the magnetic layer is plasticized in excess. It is preferable to be upto 40 wt.%.

In accordance with the magnetic recording medium of the present invention, the adhesive strength of the magnetic powder to the binder is high to have excellent durability and the dispersibility of the magnetic powder is improved and accordingly the surface gloss is improved and the magnetic characteristics of the magnetic recording medium are improved.

We claim:
1. A magnetic recording medium, which comprises:
a substrate coated with a magnetic layer formed from a magnetic composition comprising a binder and a magnetic powder, the particles of said magnetic powder having ricinoleic acid or ester thereof adsorbed thereon in an amount which increases the adhesive strength between said particles and the binder.

2. The magnetic recording medium of claim 4, wherein said magnetic powder having adsorbed ricinoleic acid or ester thereof is obtained by treating a magnetic powder with a solution of ricinoleic acid or ester.

3. The magnetic recording medium of claim 1, wherein said magnetic powder has from 0.54 to 11.3 wt% ricinoleic acid or ester thereof adsorbed thereon based on the weight of said magnetic powder.

4. The magnetic recording medium of claim 1, wherein said magnetic powder is $\gamma$-$Fe_2O_3$ or $Fe_3O_4$ having cobalt adsorbed thereon,
$\gamma$-$Fe_2O_3$, $Fe_3O_4$, $CrO_2$, Co-Ni, Fe-Co or Fe.

5. The magnetic recording medium of claim 4, wherein said binder is a polyurethane, a vinyl chloride-vinyl acetate copolymer, a vinyl chloride-vinyl acetate-vinyl alcohol copolymer, an epoxy resin, a polyester resin or nitrocellulose.

* * * * *